United States Patent [19]
Beladi et al.

[11] Patent Number: 5,699,389
[45] Date of Patent: Dec. 16, 1997

[54] OVERSAMPLING CORRELATOR WITH VIRTUAL CLOCK PHASE FOR A TELECOMMUNICATIONS DEVICE

[75] Inventors: S. Hossein Beladi, Southlake, Tex.; Paul D. Marko, Pembroke Pines, Fla.

[73] Assignee: Motorola, Inc., Schaumburg, Ill.

[21] Appl. No.: 534,914

[22] Filed: Sep. 28, 1995

[51] Int. Cl.⁶ .................................................. H04L 7/00
[52] U.S. Cl. .................................................. 375/371
[58] Field of Search .................... 375/356, 355, 375/371, 373, 354, 327

[56] References Cited

U.S. PATENT DOCUMENTS

| | | | |
|---|---|---|---|
| 4,458,206 | 7/1984 | Dellande et al. | 329/50 |
| 4,821,297 | 4/1989 | Bergmann et al. | 375/371 |
| 4,829,543 | 5/1989 | Borth et al. | 375/83 |
| 5,022,054 | 6/1991 | Wang | 375/64 |
| 5,084,891 | 1/1992 | Ariyavisitakul et al. | 371/42 |
| 5,428,647 | 6/1995 | Rasky et al. | 375/366 |

*Primary Examiner*—Stephen Chin
*Assistant Examiner*—Kevin Kim
*Attorney, Agent, or Firm*—John G. Rauch

[57] ABSTRACT

A correlation circuit (200) for detecting a correct phase for data bits in a received data stream includes a clock generator (204) configured to generate a plurality of clock signals, each clock signal having a predetermined unique clock phase. A plurality of data correlators (210, 212, 214, 216, 218, 220) generate respective pass indications when respective unique clock phases are adequate for accurate detection of the data bits in the data stream. In response to the pass indications, a control circuit (206) provides a clock signal for clocking the data. The control circuit (206) includes a delay block (278) and decision logic (270) for selectively delaying one clock phase of the generated plurality of clock phases. The control circuit may provide one of the generated clock phases or a delayed clock phase for clocking the received data.

19 Claims, 5 Drawing Sheets

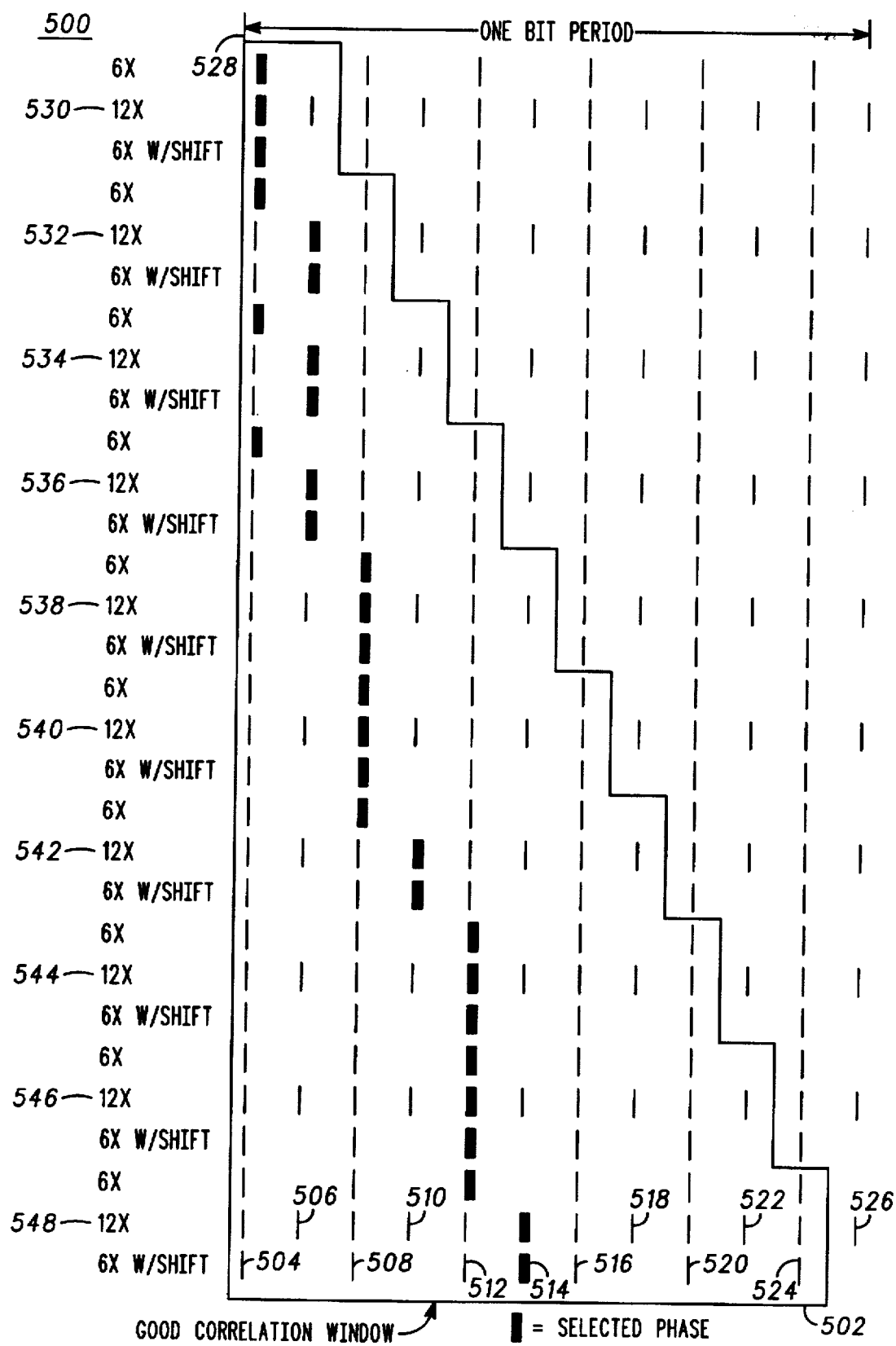

OVERSAMPLING CORRELATOR WITH VIRTUAL CLOCK PHASE FOR A TELECOMMUNICATIONS DEVICE

FIELD OF THE INVENTION

The present invention generally relates to telecommunications devices. The present invention more particularly relates to an oversampling correlator with a virtual clock phase for use in a telecommunications device.

BACKGROUND OF THE INVENTION

In a modern telecommunications system, digital data modulates a carrier signal and the resulting radio frequency (RF) signal is transmitted to a receiving unit. At the receiving unit, the RF signals are demodulated to produce a received data stream. One example of such a telecommunications system is a time division multiple access (TDMA) communications system. In a TDMA system, bursts of data are exchanged between two transceivers using the same channel in predefined time slots. At the receiving unit, the demodulated data for a time slot is raw data. That is, the receiving unit does not know the proper phase of the data to reliably reconstruct the transmitted data from the received data stream.

A correlator is required to determine the proper phase of the raw, received data. Because the receiving unit and the transmitting unit operate asynchronously, the receiving unit must determine the proper phase each time the burst of data is received. Determining the proper phase includes establishing a clock signal timed to reliably clock the received data into the receiving unit with a minimum of data errors.

The correlator is used to align the data in a received time slot by finding a synchronization pattern within the burst of data. The correlator thus correlates with a known bit pattern expected in the received time slot. Once this pattern is detected, the correlator selects the optimum phase for sampling the remaining bits in the time slot.

The known correlator for use in a telecommunications system is an oversampling correlator. The oversampling correlator generally includes several shift registers. Raw data is shifted into each shift register. Each shift register is provided with a unique clock signal having a phase different from the phases of the clock signals applied to the other shift registers. After shifting the data through the shift registers, the oversampling correlator determines which shift register, with its unique clock phase, produced the largest correlation with the recovered data. This clock phase is used thereafter to clock the remainder of the burst of data into the receiving unit.

Generally, providing more shift registers in a correlator provides better accuracy. Since each shift register is clocked with a unique clock phase, more clock phases are available to approximate the actual phase of the received data.

For example, a six times (six times) oversampling correlator includes six unique clock phases, spaced by 60 degrees (60°) of phase angle of the bit period. A twelve times (twelve times) oversampling correlator has twelve unique clock phases, spaced by 30 degrees (30°) of phase angle. The likelihood of closely approximating the actual phase of the received data is greatly increased by the availability of additional clock phases in the twelve times oversampling correlator.

However, a twelve times oversampling correlator may be impractically large for many applications. Each correlator includes a shift register and associated circuitry. Each shift register includes a chain of flip-flop circuits. In a six times oversampling correlator, this shift register circuit is repeated six times. In a twelve times oversampling correlator, this shift register circuit is repeated twelve times. Also, in a twelve times oversampling correlator circuit, additional clock generation and distribution circuitry is required as well as additional decision logic for identifying the best clock phase.

The additional gates required to implement a twelve times oversampling correlator require additional area on the surface of an integrated circuit which includes the oversampling correlator. The additional area increases the manufacturing cost of the oversampling correlator. Moreover, the additional gates required to implement a twelve times oversampling correlator will dissipate additional power when operating, a requirement which must also be accommodated.

Accordingly, there is a need for a correlation circuit which provides improved performance without the drawbacks of larger size and power dissipation.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

FIG. 5 is a diagram illustrating selected phase versus phases correlated in an oversampling correlator according to the present invention.

DETAILED DESCRIPTION OF THE PREFERRED EMBODIMENTS

Figure 1:
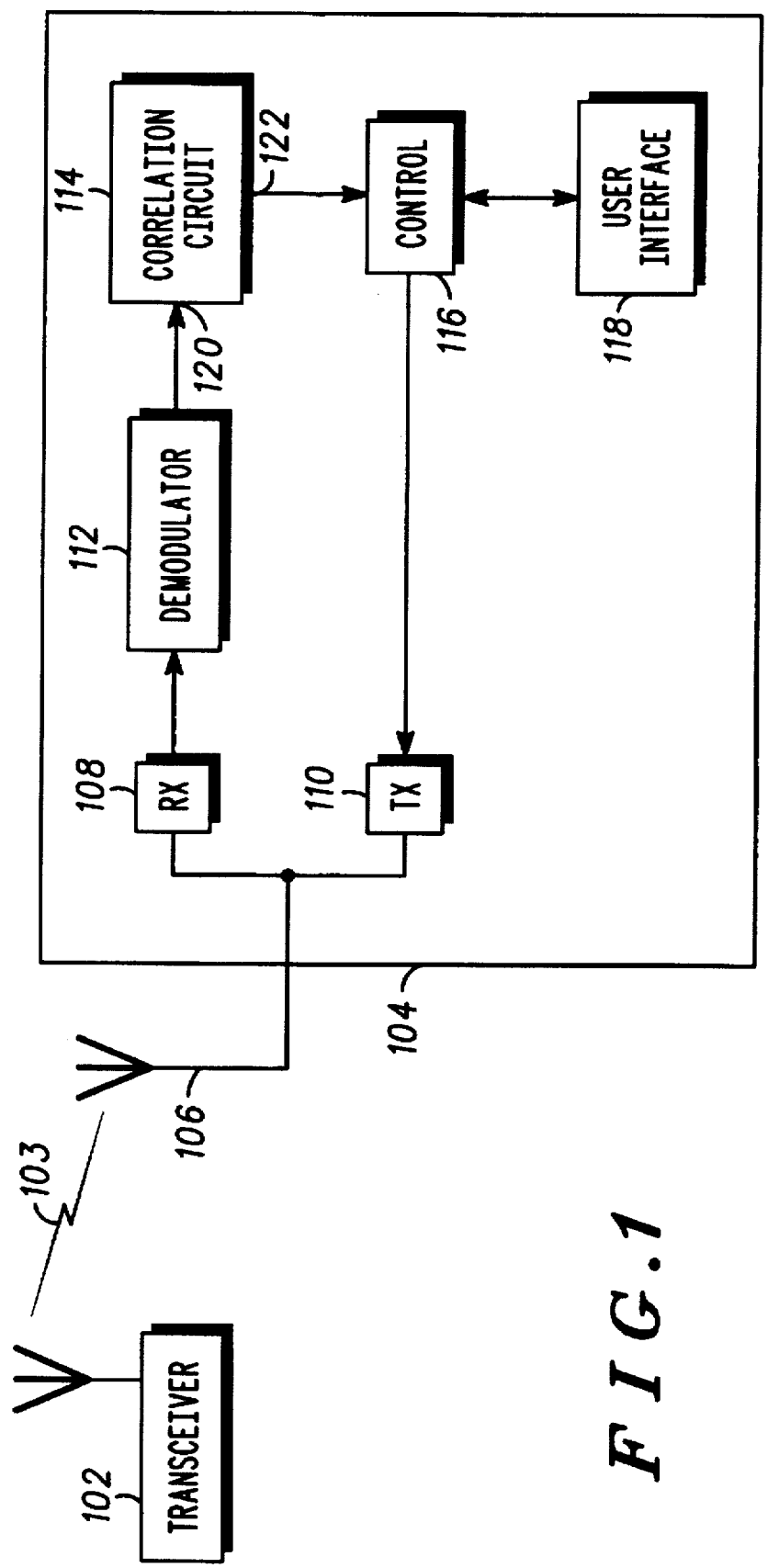
FIG. 1 is a block diagram of a radiotelephone communications system which may employ the present invention.

Referring now to FIG. 1, it shows a block diagram of a radiotelephone communications system 100 which may employ the present invention. The system 100 includes a remote transceiver 102 and one or more radiotelephone handsets such as radiotelephone handset 104. The remote transceiver 102 sends and receives radio frequency (RF) signals 103 to and from radiotelephone handsets within a fixed geographic area. The RF signals 103 include digital data transmitted serially by modulating a carrier frequency. The radiotelephone handset 104 is one such radiotelephone handset contained within the geographic area.

The radiotelephone handset 104 includes an antenna 106, a receiver 108, a transmitter 110, a demodulator 112, a correlation circuit 114, a controller 116 and a user interface 118. Upon reception of RF signals, the radiotelephone handset 104 receives the RF signals through the antenna 106. The antenna 106 converts the RF signals into electrical baseband signals. The demodulator 112 demodulates the electrical baseband signals, recovers the data transmitted on the RF signals and produces a serial data stream. This serial data stream is raw data having undetermined phase and timing. The correlation circuit 114 has an input 120 and an output 122. The correlation circuit 114 receives the raw data at the input 120 from the demodulator 112 and produces clocked data at the output 122 as will be described below. The clocked data is provided to the controller 116. The controller 116 formats the data into recognizable voice or information for use by the user interface 118. The user interface 118 communicates the received information or voice to a user. Typically, the user interface includes a display, a keypad, a speaker and a microphone (not shown).

Upon transmission of radio frequency (RF) signals 103 from the handset 104 to the remote transceiver 102, the user interface 118 transmits user input data to the controller 116. The controller 116 formats the information obtained from the user interface 118 and transmits it to the transmitter 110 for conversion into modulated RF signals. The transmitter 110 conveys the RF modulated signals to the antenna 106 for transmission to the remote transceiver 102.

For controlling transmission and receipt of data, the system 100 preferably operates according to one or more telecommunications protocols. Examples of such protocols include the Digital European Cordless Telecommunication (DECT) protocol, the Personal Handyphone System (PHS) protocol, the Global System for Mobile Telecommunication (GSM) protocol, and other communication protocols for cordless or cellular telephone systems.

Transmission and receipt of data by the transceiver 102 and the handset 104 is preferably in time division, multiple access (TDMA) format. In such a format, bursts of data are exchanged between the transceiver 102 and the handset 104 during predetermined time slots using the same channel. During a first time slot, the transceiver 102 transmits RF signals and during a second, subsequent time slot, the handset 104 transmits RF signals. Included in each burst of data transmitted in a time slot is a known bit pattern used for synchronization of communication between the handset 104 and the transceiver 104. For example, in the DECT system, the known bit pattern includes a 16-bit synchronization pattern. The correlation circuit 114 detects this known bit pattern and correlates with the pattern. Once the known bit pattern is detected, the correlation circuit 114 selects the optimum phase for sampling the remaining bits in the time slot.

Figure 2:
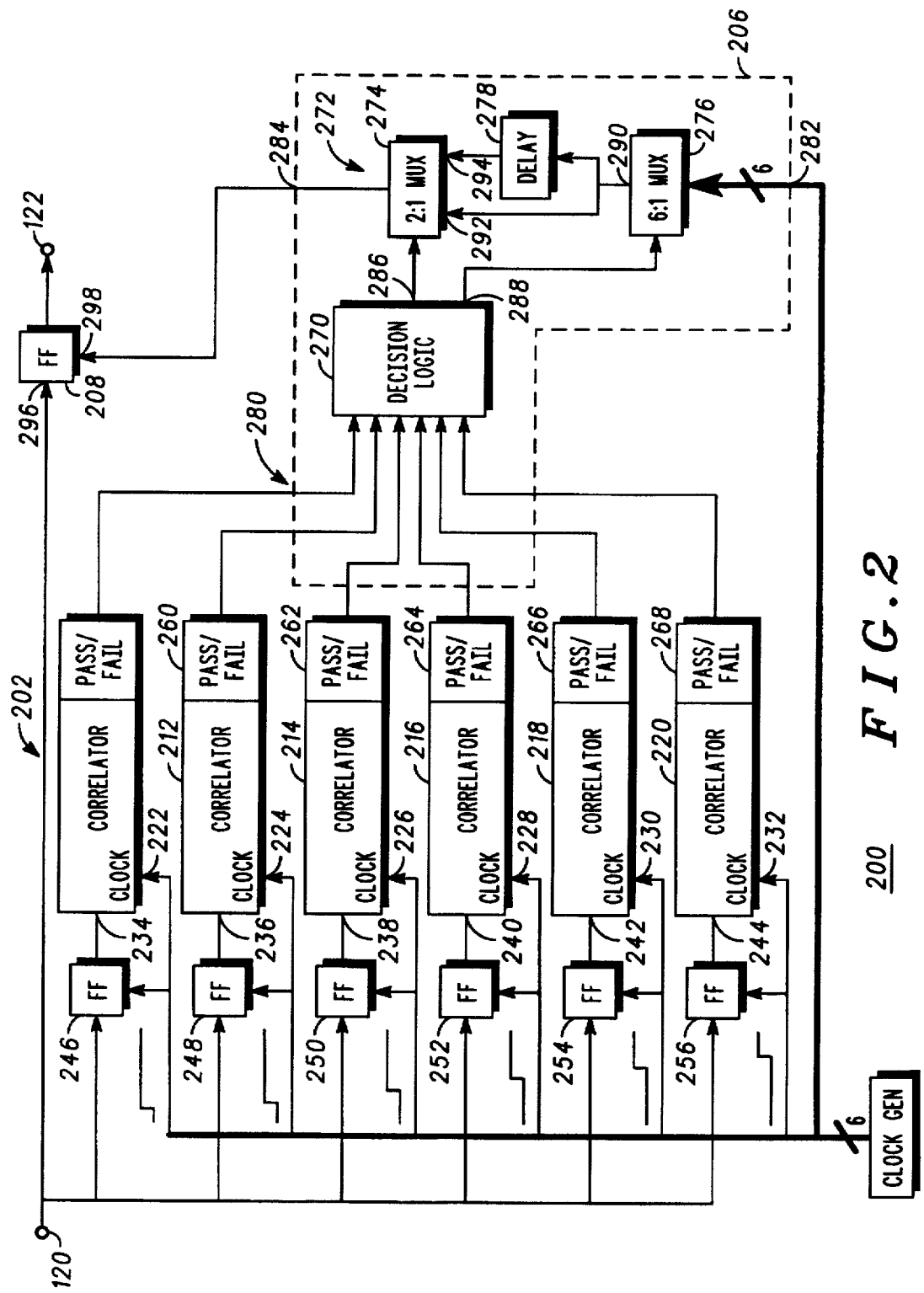
FIG. 2 is a block diagram of a correlation circuit according to the present invention, and which may be used in the radiotelephone communications system of FIG. 1.

FIG. 2 is a block diagram of a correlation circuit 200 according to the present invention which may be used to form correlation circuit 114 in the radiotelephone communication system 100 of FIG. 1. The correlation circuit 200 could also be used with any communication device, including a radiotelephone base station such as remote transceiver 102 in FIG. 1. The correlation circuit 200 includes circuit input 120 and circuit output 122. The correlation circuit 200 further includes a plurality 202 of data correlators, a clock generator 204, a control circuit 206 and an output circuit 208.

The clock generator 204 is configured to generate a plurality of clock signals. Preferably, the clock generator 204 generates six clock signals. However, the clock generator 204 may generate as many clock signals as are required by the correlation circuit 200. For example, if the correlation circuit is a six times oversampling correlation circuit, the clock generator will generate six clock signals. If the correlation circuit 200 is a twelve times oversampling correlation circuit, the clock generator 204 will generate twelve clock signals.

Figure 3:
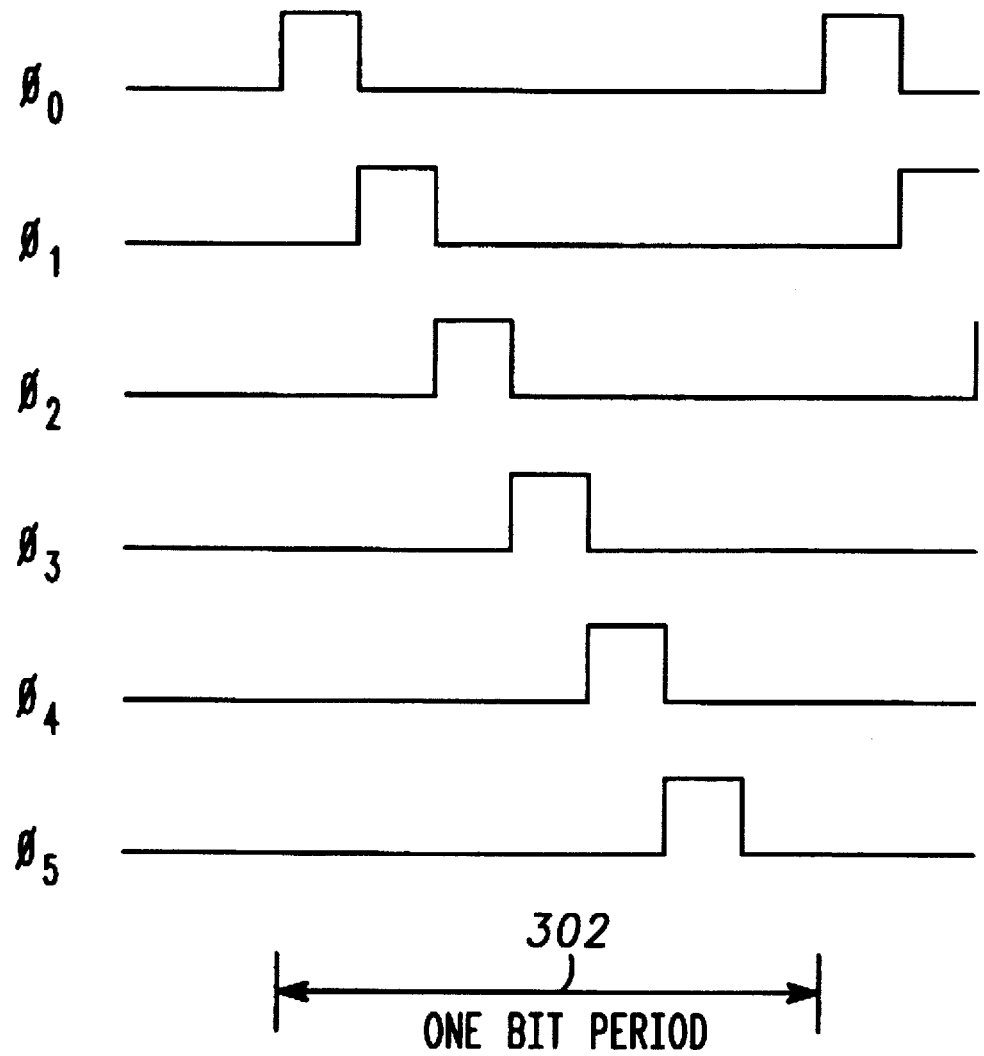
FIG. 3 is a timing diagram for the clock signals of FIG. 2.

Each clock signal of the plurality of clock signals has a predetermined unique clock phase. That is, each clock signal generated by the clock generator has a phase different from every other clock signal. FIG. 3 is a timing diagram showing one possible configuration for clock signals generated by the clock generator 204 of FIG. 2. In FIG. 3, the six clock signals are individually labeled $\phi_0, \phi_1, \phi_2, \phi_3, \phi_4, \phi_5$. The six clock signals are evenly spaced during the duration of one bit period, the bit period being defined by the transmission frequency of the communication protocol. As illustrated in FIG. 3, the clock generator 204 generates N clock signals $\phi_0, \phi_1, \phi_2, \phi_3, \phi_4, \phi_5$, where each of the N clock signals has a common clock period 302. Each clock signal $\phi_0, \phi_1, \phi_2, \phi_3, \phi_4, \phi_5$ has a clock phase differing from another clock phase by 1/N times the common clock period 302. Preferably, N=6, but may be any number. The clock signals may be unevenly spaced, and in general, may have other relationships other than those illustrated in FIG. 3.

Referring again to FIG. 2, the plurality 202 of data correlators preferably includes six data correlators 210, 212, 214, 216, 218, 220. The number of correlators may vary depending on the requirements of the system 100 (FIG. 1). In general, a six times oversampling correlator, as is illustrated in FIG. 2, will have six data correlators and six clock signals generated by the clock generator 204. Similarly, a twelve times oversampling correlator will include twelve data correlators and twelve clock signals generated by the clock generator 204.

Each of the data correlators 210, 212, 214, 216, 218, 220 is generally identical. Each data correlator 210, 212, 214, 216, 218, 220 includes a respective clock input 222, 224, 226, 228, 230, 232 coupled to the clock generator 204 for receiving one clock signal of the plurality of clock signals $\phi_0, \phi_1, \phi_2, \phi_3, \phi_4, \phi_5$. Each data correlator further includes a respective input 234, 236, 238, 240, 242, 244 coupled to the circuit input 120 for receiving the data stream from the demodulator 112 (FIG. 1). Preferably, a flip-flop 246, 248, 250, 252, 254, 256 is located between each respective correlator input 234, 236, 238, 240, 242, 244, and the circuit input 120 of the correlation circuit 200. The respective flip flops 246, 248, 250, 252, 254, 256 serve as delay blocks to cause the received data stream to coincide with the respective clock phase. Each respective flip-flop 246, 248, 250, 252, 254, 256 receives a respective clock signal and stores all or a portion of the received data stream. While the respective flip flops are illustrated as being structurally separate from the respective data correlators 210, 212, 214, 216, 218, 220, the data correlators may optionally be included as a part of the respective data correlators. Each data correlator 210, 212, 214, 216, 218, 220 preferably includes a respective pass/fail block 258, 260, 262, 264, 266, 268.

Operation of each respective data correlator 210, 212, 214, 216, 218, 220 for correlating the receive data stream with each respective clock signal over the plurality of clock signals is well-known in the art. At each correlator 210, 212, 214, 216, 218, 220, the respective pass/fail block 258, 260, 262, 264, 266, 268 produces a pass or fail output. The pass/fail output is preferably a binary output including a pass indication and a fail indication, but may be any suitable signal. If the clock phase of the respective clock signal received by each respective correlator is adequate for accurate detection of the data stream, each respective pass/fail block 258, 260, 262, 264, 266, 268 will produce a respective pass indication. If the unique clock phase of the respective clock signal received by the respective correlator is not adequate for accurate detection of the data stream, a fail indication will be generated by the respective pass/fail block 258, 260, 262, 264, 266, 268. Thus, where six correlators are used, as in FIG. 2, any combination from 0–6 pass indications will be produced by the plurality 202 of data correlators.

Generally, as a practical matter, the pass indications produced by the plurality 202 of data correlators will be grouped together. Thus, in one example, a first group of data correlators 212, 214, 216 will generate pass indications for a received data stream. In a second example, a second group correlators 216 and 218 will generate pass indications for the same received data stream. It is unlikely that ungrouped correlators will generate pass indications The cone same data stream.

The control circuit 206 includes decision logic 270, a switch circuit 272 including multiplexer 274 and multiplexer 276, and a delay block 278. The control circuit 206 has a plurality of inputs 280. Each input is coupled to a respective data correlator for receiving a pass indication provided by the respective data correlator. The control circuit further includes a clock input 282 for receiving the plurality of clock signals from the clock generator 204. The control circuit further includes an output 284 coupled to the output circuit 208.

The decision logic 270 receives the pass indications generated by the data correlators 210, 212, 214, 216, 218, 220. The decision logic forms a decision circuit for determining the correct phase for data bits in the received data stream in response to the received pass indications. Further, the decision circuit determines when the correct clock phase for data bits in the data stream is a phase in-between two of the unique clock phases generated by the clock generator 204.

The decision logic 270 includes a first output 286 and a second output 288 for providing a control signal to the switch circuit 272. In response to the control signal, multiplexer 276 selects one clock signal of the plurality of clock signals received at the input 282 and provides the selected clock signal to an output 290 of the multiplexer 276. The selected clock signal is thus provided to both the delay circuit 278 and a first input 292 of multiplexer 274. The delay circuit 278 delays the selected clock signal by a predetermined amount to produce a delayed clock signal, which is provided to the second input 294 of the mutiplexer 274. In response to the control signal provided at output 286 of decision logic 270, multiplexer 274 provides either a selected clock signal, received at first input 292, or the delayed clock signal received at second input 294 to the output 284 of the control circuit 206.

The output circuit 208 has an input 298 coupled to the circuit input 120 of the correlation circuit 200 for receiving the data stream. The output circuit 208 further includes a clock input 298 coupled to the output 284 of the control circuit 206 for receiving a clock signal from the control circuit 206. In response to the received clock signal, the output circuit 208 produces a clocked data stream at the circuit output 122, the clocked data stream having the correct clock phase for accurately receiving the data.

Whenever the handset 104 receives a new burst of data from the transceiver 102, a new clock phase must be acquired. If the communications protocol which defines communication between the handset 104 and the transceiver 102 specifies time domain multiple access (TDMA) communication, a new clock phase must be acquired for accurate reception of data during every time slot. The acquired clock phase may not be the same clock phase as the preceding burst of data. Moreover, the new clock phase may change depending on the transmitter and channel characteristics during signal propagation.

Frequently, when the transmitter and channel characteristics are relatively stable, the newly acquired clock phase is not far from the previously acquired clock phase. For example, in a six times oversampling correlator, as is illustrated in FIG. 2, the correlation circuit 200 has six clock phases described as clock phases 0–5 or $\phi_0, \phi_1, \phi_2, \phi_3, \phi_4, \phi_5$, as is illustrated in FIG. 3. The correlation circuit 200 may select any of six phases as the best phase for providing the largest correlation with the recovered data. The 360° of a clock cycle is divided by 6, representing a clock phase at every 60°. Therefore, the worst case situation will force the correlator to have 30° of phase error with the recovered data using only the six clock phases provided by clock generator 204. However, the history of the selected clock phases may indicate a phase history of preferred clock phases and may have a pattern similar to the following phases:

3-4-3-4-3-4-5-4-5-4-3-2-3-2-3-2 . . .

The phase history provides useful information indicating that, in a series of phase changes, the selected phase did not move more than one phase from the previous phase and that a better phase selection exists between the two previous phases. For example, where the history shows the selected phases included phases 4-5-4, phase four is a first preferred phase and phase five is a second preferred phase. In this case, a phase between phase four and phase five should have been a better phase selection. Since a six times oversampling correlator has only six clock phases to choose from, and none of the clock phases are between phase four and phase 5, no phase is available matching the phase determined to be the best or correct phase.

The correlation circuit 200 in accordance with the present invention provides a virtual clock phase which may be located between any of the clock phases established by the clock generator 204. The virtual clock phase is established by first selecting an approximate clock phase using the multiplexer 276. In response to the pass indications received from the correlators 210, 212, 214, 216, 218, 220, decision logic 270 determines which of the six clock phases provided by the clock generator 204 approximates the best or correct clock phase. In the example given above, decision logic 270 establishes a phase history of preferred clock phases (phases four and five) and selects phase four. Decision logic 270 applies a control signal to the multiplexer 276 and multiplexer 276 provides the approximate clock phase to the output 290. To provide the virtual clock phase, the approximate clock phase is delayed in the delay block 278. The delayed clock phase is provided to the second input 294 of multiplexer 274. Decision logic 270 provides an appropriate control signal at the output 276 to the multiplexer 274 to cause the multiplexer 274 to provide the delayed clock phase to the output 284 of the control circuit 206.

In this fashion, a virtual clock phase having a phase between two of the phases provided by clock generator 204 is generated by the control circuit 206. The delay circuit 278 may provide a fixed or predetermined delay to a received clock phase. For example, the delay circuit may delay the approximate clock phase by one-half the time between the approximate clock phase and an immediately subsequent clock phase. This minimizes the worst-case phase error between the delayed clock phase and the correct or best clock phase. Alternatively, the delay circuit 278 may provide a variable or programmable delay under control from the decision logic 270. In this manner, the correlation circuit 200 provides the functionality of a twelve times oversampling correlator using only the hardware of a six times oversampling correlator.

In addition to the use of phase history to determine the best or correct phase, the correlation circuit 200 may also use the pass indications generated by the plurality 202 of correlators to select a real time best or correct phase. For example, if correlator 214 provides a pass indication, indicating that phase two provided by clock generator 204 is adequate for clocking received data, and correlator 216 provides a pass indication similarly indicating that phase three is adequate for clocking data in response to these pass indications, decision logic 270 may generate a control signal to cause the switch circuit 272 to delay phase two and provide the delayed phase two clock signal to the output circuit 208.

It should be noted that the correlation circuit 200 retains full functionality of a six times oversampling correlator. For example, if the decision logic 270 determined that clock phases one, two and three are adequate for receipt of data, then phase two is selected to be the best phase and is provided to the output circuit 208. The correlation circuit 200 provides the added functionality, however, of making available a virtual phase in-between the generated clock phases for use as the best or correct phase.

Figure 4:
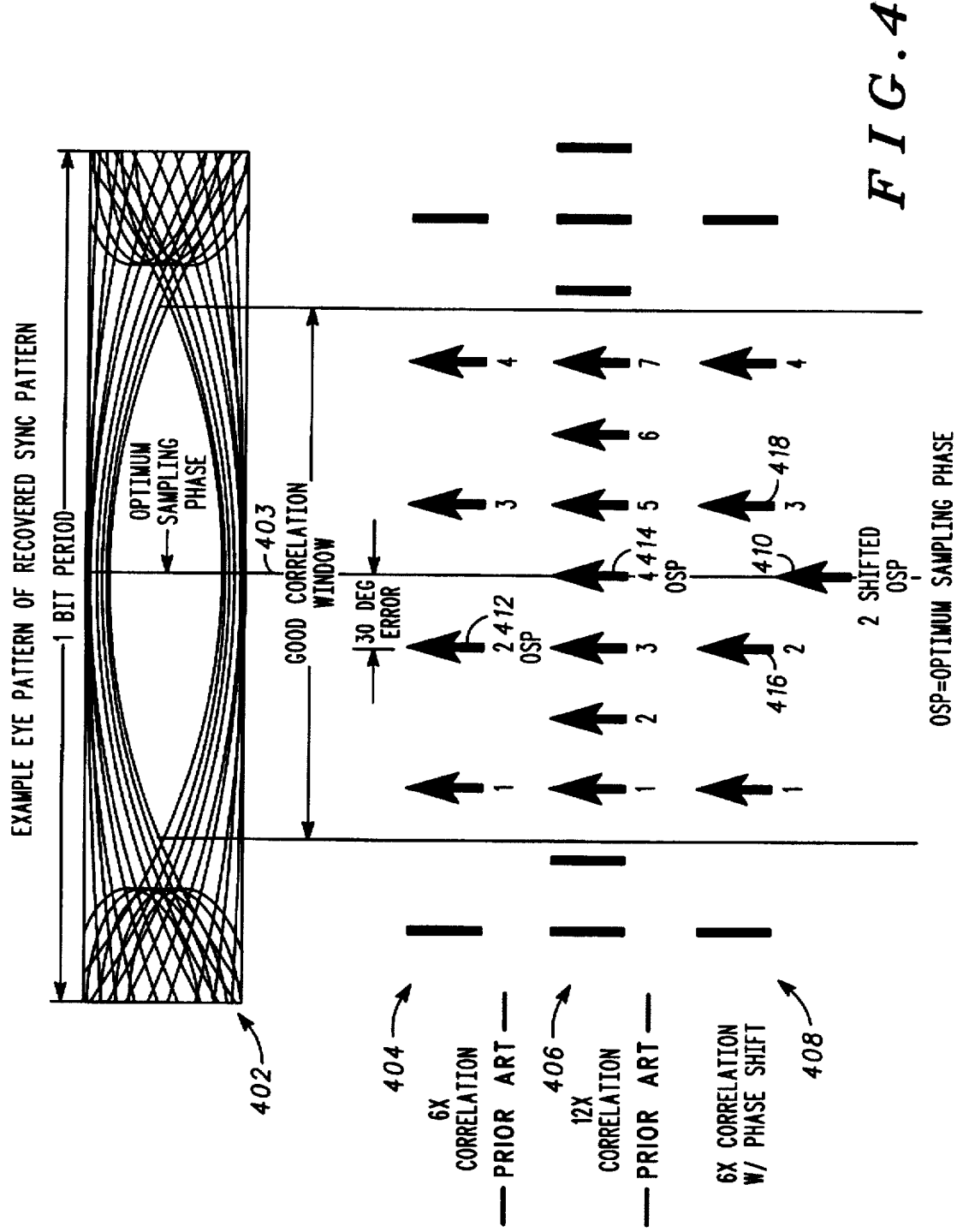
FIG. 4 is a diagram comparing oversampling of received data by prior art oversampling correlators and by the correlation circuit of FIG. 2.

FIG. 4 is a diagram comparing oversampling of received data by prior art oversampling correlators and by the correlation circuit of FIG. 2. FIG. 4 shows an example eye pattern 402 of a recovered data synchronization pattern. The optimum sampling phase 403, or the clock phase which provides the most accurate recovered data is located substantially at the center of the eye of the eye pattern.

FIG. 4 also shows the clock phases available using the prior art oversampling correlators, including clock phases 404 available using a six times oversampling correlator and clock phases 406 available using a prior art twelve times oversampling correlator. Still further, FIG. 4 shows the clock phases 408 available using a six times oversampling correlator with phase shift according to the present invention.

The prior art six times oversampling correlator determines that the optimum sampling phase 403 is located substantially at the center of the eye of the eye pattern 402. However, the clock phases 404 available in the prior art six times oversampling correlator do not closely match the optimum sampling phase. In the worst case situation, illustrated in FIG. 4, 30° of phase error separates the optimum sampling phase 403 from the nearest available phase, phase two 412. The prior art six times oversampling correlator will select phase two 412 from among the clock phases 404 as being the best approximation to the optimum sampling phase.

The prior art twelve times oversampling correlator has available among the clock phases 406 a clock phase four 414 which closely matches the optimum sampling phase 403. Therefore, the prior art twelve times oversampling correlator will select clock phase four 414 as the best or correct clock phase. However, as described above, a twelve times oversampling correlator requires substantially more circuitry, circuit area and power dissipation to implement than a six times oversampling correlator. Many applications may not be able to accommodate these requirements.

The six times oversampling correlator with phase shift according to the present invention has available among its clock phases 408 a virtual or shifted phase two 410. The decision logic 270 (FIG. 2) determines that the best or correct phase is a phase between phase two 416 and phase three 418. In response, the decision logic 270 provides a control signal to the switch circuit 272 to delay phase two 416 in the delay block 278 and provide delayed phase two 410 to the output circuit 208. The delayed phase two 410 closely matches the optimum sampling phase 403 for the recovered data.

Even in the case where the optimum sampling phase 403 is not centered between the generated phases (for example phase two 416 and phase three 418) of the six times oversampling correlator with phase shift according to the present invention, the delayed or shifted phase two 410 provides a clock phase substantially closer to the optimum sampling phase 403 than either phase two 416 or phase three 418. In a worst case situation, with the delayed phase two 410 centered between phase two 416 and phase three 418, the worst case phase error is only 15°, which is a substantial improvement over the prior art six times oversampling correlator.

FIG. 5 is a diagram illustrating selected phase versus phases correlated in a six times oversampling correlator according to the present invention. Possible selected phases are plotted along the horizontal axis 502. These possible selected phases include phase one 504, phase one with shift 506, phase two 508, phase two with shift 510, phase three 512, phase three with shift 514, phase four 516, phase four with shift 518, phase five 520, phase five with shift 522, phase six 524 and phase six with shift 526. In selecting the optimum sampling phase, six times oversampling correlator according to the present invention can select any of these clock phases.

The phases correlated by the correlation circuit 200, as well as the results for a prior art six times oversampling correlator and a twelve times oversampling correlator are plotted on the vertical axis 528. Thus, ordinate 530 corresponds to correlation with phase one 504 and phase one with shift 506. Ordinate 532 corresponds to correlation with phase one 504, phase one with shift 506 and phase two 508. Ordinate 534 corresponds to correlation with phase one 504, phase one with shift 506, phase two 508 and phase two with shift 510. Ordinate 536 corresponds to correlation with phase one 504, phase one with shift 506, phase two 508, phase two with shift 510, and phase three 512. Ordinate 538 corresponds to correlation with phase one 504, phase one with shift 506, phase two 508, phase two with shift 510, phase three 512 and phase three with shift 514. Ordinate 540 corresponds to correlation with phase one 504, phase one with shift 506, phase two 508, phase two with shift 510, phase three 512, phase three with shift 514 and phase four 516. Ordinate 542 corresponds to correlation with phase one 504, phase one with shift 506, phase two 508, phase two with shift 510, phase three 512, phase three with shift 514, phase four 516 and phase four with shift 518. Ordinate 544 corresponds to correlation with phase one 504, phase one with shift 506, phase two 508, phase two with shift 510, phase three 512, phase three with shift 514, phase four 516, phase four with shift 518 and phase five 520. Ordinate 546 corresponds to correlation with phase one 504, phase one with shift 506, phase two 508, phase two with shift 510, phase three 512, phase three with shift 514, phase four 516, phase four with shift 518, phase five 520 and phase five with shift 522. Ordinate 548 corresponds to correlation with phase one 504, phase one with shift 506, phase two 508, phase two with shift 510, phase three 512, phase three with shift 514, phase four 516, phase four with shift 518, phase five 520, phase five with shift 522 and phase six 524.

The six times oversampling correlator with shift according to the present invention performs substantially identically to the performance of the prior art twelve times oversampling correlator. Thus, for example, at ordinate 534, the six times oversampling correlator with shift according to the present invention selects phase one with shift 506, which is also the phase selected by the prior art twelve times oversampling correlator. In contrast, at ordinate 534, the prior art six times oversampling correlator selects phase one 504. Thus, the six times oversampling correlator with shift according to the present invention provides substantially the same performance as the prior art twelve times oversampling correlator while using substantially less circuitry.

From the foregoing, it can be seen that the present invention provides a correlation circuit for detecting a correct phase for data bits in a received data stream in a communication channel. The correlation circuit determines the best phase in response to the received data. Where the best phase is a phase positioned between clock phases produced by a clock generator, the correlation circuit delays one of the generated clock phases to better approximate the best clock phase. The best clock phase decision may be based upon phase history or in response to real time detection of more than one adequate phases.

While a particular embodiment of the present invention has been shown and described, modifications may be made. For example, while the invention has been described in conjunction with a six times oversampling correlator, any size oversampling correlator including any number of clock phases could be used in conjunction with the invention. Also, for example, while the invention has been described in use with a radiotelephone handset, the invention could be used with any communication device, such as a radiotelephone base station. It is therefore intended in the appended claims to cover all such changes and modifications which fall within the true spirit and scope of the invention.

What is claimed is:

1. A correlation circuit for detecting a correct phase of data bits in a data stream in a communication channel, the correlation circuit having a circuit input for receiving the data stream and a circuit output for providing the data bits at the correct phase, the correlation circuit comprising:

an output circuit coupled to the circuit output, the output circuit configured to provide the data bits at the correct phase, the output circuit having a clock input;

a clock generator configured to generate a plurality of clock signals, each clock signal having a predetermined unique clock phase;

a plurality of data correlators, each of the plurality of data correlators having a respective input coupled to the circuit input for receiving the data stream and a respective clock input coupled to the clock generator for receiving a respective received one clock signal having a respective predetermined unique clock phase of the plurality of clock signals, each of the plurality of data correlators configured to provide a pass indication when the respective predetermined unique clock phase of the respective received one clock signal is adequate for accurate detection of the data bits; and a control circuit having a plurality of inputs, each input coupled to a respective data correlator for receiving one or more respective pass indications, the control circuit having an output coupled to the clock input of the output circuit, the control circuit having a clock input for receiving the plurality of clock signals, the control circuit having an output coupled to the clock input of the output circuit, the control circuit delaying one clock signal of the plurality of clock signals to produce a delayed clock signal in response to the one or more respective pass indications and providing the delayed clock signal to the clock input of the output circuit when the correct phase is a phase between the predetermined unique clock phase of the one clock signal and the predetermined unique clock phase of another clock signal.

2. A correlation circuit as defined in claim 1 wherein the control circuit includes a first switch for selecting one clock signal of the plurality of clock signals, the first switch having a plurality of inputs coupled to the clock generator for receiving the plurality of clock signals and an output for providing a selected clock signal, the control circuit further including a delay circuit having an input coupled to the output of the first switch for delaying the selected clock signal, the delay circuit having an output for providing a delayed selected clock signal.

3. A correlation circuit as defined in claim 2 wherein the control circuit further includes a second switch having a first input coupled to the output of the first switch and a second input coupled to the output of the delay circuit and an output coupled to the clock input of the output circuit, the second switch selectively providing one of the selected clock signal and the delayed selected clock signal to the clock input of the output circuit in response to the one or more respective pass indications.

4. A correlation circuit as defined in claim 3 wherein the control circuit includes a decision circuit for determining the correct phase in response to the one or more respective pass indications and for determining when the correct phase is a phase between the predetermined unique clock phase of the one clock signal and the predetermined unique clock phase of another clock signal.

5. A correlation circuit as defined in claim 1 wherein the control circuit stores a phase history for the communication channel, and wherein the control circuit determines when the correct phase is a phase between the predetermined unique clock phase of the one clock signal and the predetermined unique clock phase of another clock signal in response to the phase history.

6. A method for determining correct clock phase of received data, the received data being received in a serial data stream, the method comprising the steps of:

generating a plurality of clock signals, each clock signal having one predetermined unique clock phase of a plurality of predetermined unique clock phases;

correlating the received data with each of the plurality of clock signals;

determining a best clock phase for the received data from among the plurality of predetermined unique clock phases of the plurality of clock signals; and when the best clock phase does not match any of the plurality of predetermined unique clock phases, delaying one clock signal of the plurality of clock signals a predetermined amount to produce a delayed clock signal, the delayed clock signal having a clock phase different from each of the plurality of predetermined unique clock phases, and providing the delayed clock signal as a clock signal having a correct clock phase for the received data.

7. A method as defined in claim 6 wherein the generating step comprises the step of generating N clock signals, each of the N clock signals having a common clock period, each clock signal having a clock phase differing from another clock phase by 1/N times the common clock period.

8. A method as defined in claim 7 wherein N=6.

9. A method as defined in claim 7 wherein the delaying step comprises delaying the one clock signal by substantially ½N times the common clock period.

10. A radiotelephone handset configured for communication with a remote transceiver, the radiotelephone handset configured to receive a plurality of bursts of data from the remote transceiver, each of the plurality of bursts of data including a serial data stream, the radiotelephone handset comprising:

an antenna configured to detect radio frequency signals transmitted by the remote transceiver;

a receiver coupled to the antenna for receiving the radio frequency signals;

a demodulator coupled to the receiver, the demodulator demodulating the radio frequency signals to produce the serial data stream;

a correlation circuit coupled to the demodulator for receiving the serial data stream and producing a clocked data stream, the correlation circuit including:

a clock generator configured to generate a plurality of clock signals, each clock signal having one predetermined unique clock phase of a plurality of predetermined unique clock phases;

a delay circuit for delaying a selected one clock signal by a predetermined amount to produce a delayed clock signal;

a plurality of data correlators, each of the plurality of data correlator receiving one clock signal and the serial data stream, each of the plurality of data correlator producing a respective pass indication if the serial data stream correlates with the one clock signal;

decision logic having a plurality of inputs, each of the plurality of inputs being coupled to a respective data correlator for receiving each respective pass indication, the decision logic determining a best clock signal for receiving the serial data stream in response to received pass indications, the decision logic producing a control signal indicative of the best clock signal; and a switch circuit coupled to the decision logic, the clock generator and the delay circuit, the switch circuit providing one of the plurality of clock signals to the delay circuit in response to the control signal, the switch circuit selecting one of the plurality of clock signals as a selected clock signal in response to the control signal, the switch circuit providing one of the delayed clock signal and the selected clock signal in response to the control signal for clocking the serial data stream to produce the clocked data stream.

11. A radiotelephone handset as defined in claim 10 wherein the decision logic determines the best clock signal from one or more clock signals corresponding to clock signals received by data correlators producing pass indications.

12. A radiotelephone handset as defined in claim 11 wherein the decision logic determines the best clock signal from a group of clock signals including the one or more clock signals and each of the one or more clock signals delayed by the delay circuit.

13. A radiotelephone handset as defined in claim 12 wherein, when the decision logic determines the best clock signal has a clock phase between a first predetermined clock phase of a first clock signal and a second predetermined clock phase of a second, subsequent clock signal, the switch circuit provides a clock signal corresponding to the first clock signal delayed by the delay circuit.

14. A method for receiving data in a telecommunication device, the telecommunication device receiving a data stream and producing clocked data, the data stream having a correct phase, the method comprising the steps of:

generating N unique clock phases;

selecting an approximate clock phase from among the N unique clock phases;

delaying the approximate clock phase a predetermined amount to produce a delayed clock phase, the delayed clock phase being different from each of the N unique clock phases, the delayed clock phase substantially matching the correct phase; and clocking the data stream using the delayed clock phase to produce the clocked data.

15. A method as recited in claim 14 wherein the method further comprises the steps of establishing a phase history of preferred clock phases and wherein the delaying step comprises delaying the approximate clock phase to match a clock phase between a first preferred clock phase and a second preferred clock phase.

16. A method as recited in claim 15 wherein the selecting step comprises the step of selecting as the approximate clock phase the first preferred clock phase.

17. A method as recited in claim 14 wherein the delaying step comprises delaying the approximate clock phase one-half the time between the approximate clock phase and an immediately subsequent clock phase.

18. A method as defined in claim 6 wherein the delayed clock signal has a clock phase intermediate two clock phases of the plurality of predetermined unique clock phases.

19. A method as recited in claim 14 wherein the unique clock phase is intermediate two clock phases of the N unique clock phases.

* * * * *